(12) United States Patent
Fenton

(10) Patent No.: US 6,328,324 B1
(45) Date of Patent: Dec. 11, 2001

(54) AIR RIDE SUSPENSION SYSTEM

(75) Inventor: E. Dale Fenton, Columbia, MO (US)

(73) Assignee: Trailair, Inc., Fulton, MO (US)

( * ) Notice: Subject to any disclaimer, the term of this patent is extended or adjusted under 35 U.S.C. 154(b) by 0 days.

(21) Appl. No.: 09/524,044

(22) Filed: Mar. 13, 2000

Related U.S. Application Data

(60) Provisional application No. 60/170,216, filed on Dec. 10, 1999.

(51) Int. Cl.$^7$ .................................................. B60G 11/46
(52) U.S. Cl. ......................... 280/124.163; 280/124.162; 280/124.165; 280/124.175
(58) Field of Search ..................... 280/124.162, 124.163, 280/124.165, 124.175, FOR 175, FOR 177, FOR 169, 124.17

(56) References Cited

U.S. PATENT DOCUMENTS

| | | |
|---|---|---|
| 887,002 | 5/1908 | Marriner . |
| 1,796,235 | 3/1931 | Billingsley . |
| 2,358,518 | 9/1944 | Kraft . |
| 2,802,663 | 8/1957 | Hovind . |
| 3,170,712 * | 2/1965 | Hildebrandt . |
| 3,237,957 | 3/1966 | Harbers . |
| 3,612,572 * | 10/1971 | Raidel . |
| 3,664,452 | 5/1972 | Schaeff . |
| 4,181,324 | 1/1980 | Hixon . |
| 4,277,087 | 7/1981 | Turner et al. . |
| 4,294,439 | 10/1981 | McIntosh, deceased . |
| 4,379,572 | 4/1983 | Hedenberg . |
| 4,397,478 * | 8/1983 | Jensen et al. . |
| 4,518,171 | 5/1985 | Hedenberg . |
| 4,711,465 | 12/1987 | Raidel . |
| 4,718,693 | 1/1988 | Booher . |
| 4,773,670 | 9/1988 | Raidel, II . |
| 5,002,305 | 3/1991 | Raidel . |
| 5,007,660 * | 4/1991 | Orndorff, Jr. et al. . |
| 5,029,885 * | 7/1991 | Steiner . |
| 5,362,095 * | 11/1994 | Eveley . |
| 5,887,881 | 3/1999 | Hatch . |
| 5,924,712 | 7/1999 | Pierce . |
| 5,938,221 | 8/1999 | Wilson . |
| 6,015,158 * | 1/2000 | Overby . |

FOREIGN PATENT DOCUMENTS

1136383 * 5/1957 (FR) ............................ 280/FOR 175

* cited by examiner

Primary Examiner—Eric Culbreth
(74) Attorney, Agent, or Firm—Trexler, Bushnell, Giangiorgi, Blackstone & Marr, Ltd.

(57) ABSTRACT

The present invention provides a suspension system for a light duty trailer which includes a pair of modules. Each module is provided on an end of the axle and includes a spring member, a tower for connecting a front end of the spring member to an underside of the light duty trailer, an air spring connected between the underside of the light duty trailer and the spring member, and a limiting assembly for connecting a rear end of the spring member to the underside of the light duty trailer. In operation, if no bumps or ruts are encountered, the spring member remains generally horizontal relative to the underside of the light duty trailer. If a bump is encountered, the rear end of the spring member moves upwardly relative to the underside of the light duty trailer and the air spring compresses. If a rut is encountered, the rear end of the spring member moves downwardly relative to the underside of the light duty trailer and the air spring expands. The limiting assembly limits the amount of travel of the spring member.

16 Claims, 4 Drawing Sheets

AIR RIDE SUSPENSION SYSTEM

The present invention claims the priority of U.S. Provisional Application Serial No. 60/170,216, filed on Dec. 10, 1999 and entitled "Air Ride Suspension".

BACKGROUND OF THE INVENTION

This invention is generally directed to a novel air ride suspension system for a vehicle, such as a trailer. More particularly, the invention contemplates a novel air ride suspension system for a vehicle which dissipates normal road vibrations and stress to provide a safe, smooth and longer lasting suspension, thereby resulting in an improved ride over prior art suspension systems, improved performance for aluminum and steel gooseneck trailers, recreational vehicle trailers, fifth wheel travel trailers, and improved life span of the vehicle.

U.S. Pat. No. 5,362,095 to Eveley discloses a prior art air ride suspension system. In the '095 pattent, upper and lower leaf springs are pivotally connected at their front ends to a tower which is connected to an underside of the vehicle. An air spring is mounted between the underside of the vehicle and the rear end of the upper leaf spring. The axle is mounted to the upper and lower leaf springs. A shock absorber is provided between the tower and the axle.

In operation, if no bumps or ruts are encountered, the left spring remains generally horizontal relative to the underside of the vehicle. If one or both of the tires encounter a bump in the road, the rear end of the leaf springs move upwardly relative to the underside of the vehicle and the air spring and the shock absorber compress. If one or both of the tires encounter a rut in the road, the rear end of the leaf springs move downwardly relative to the underside of the vehicle and the air spring and the shock absorber expand.

With this prior art design, the air spring can expand to its maximum allowable distance indicated by the air spring manufacturer and can be torn apart during use. In addition, the design does not prevent lateral movement of the leaf spring and subsequent lateral movement of the air spring and the shock absorber during use of the vehicle even during turning or backing up of the vehicle which can cause damage to the air spring and the shock absorber. Moreover, the design does not provide lateral stability through the extent of vertical travel of the leaf spring, which can result in poorer stability for and reduced torsion on the leaf spring, the air spring and the shock absorber.

The present invention provides a novel air ride suspension system for a vehicle, such as a trailer, which overcomes the problems presented in the prior art and which provides additional advantages over the prior art. These advantages will become clear upon a reading of the attached specification in combination with a study of the drawings.

OBJECTS AND SUMMARY OF THE INVENTION

A general object of the present invention is to provide a novel air ride suspension system for a vehicle, such as a trailer.

Another general object of the present invention is to provide a novel air ride suspension system for a vehicle, particularly a recreational vehicle, gooseneck or fifth wheel travel trailer, which is primarily designed for axle capacities ranging in size from 3000 lbs. to 8000 lbs.

Yet another general object of the present invention is to provide a novel air ride suspension system for a vehicle which dissipates normal road vibrations and stress to provide a safe, smooth and longer lasting suspension, thereby resulting in an improved ride over prior act suspension systems, improved performance for recreational vehicle trailers, aluminum and steel gooseneck trailers, fifth wheel travel trailers, and improved life span of the vehicle.

An object of the present invention is to provide a novel air ride suspension system which uses a limiting assembly to secure a rear end of a spring member to a frame of the vehicle.

Another object of the present invention is to provide a novel air ride suspension system which uses a limiting assembly to secure a rear end of a spring member to a frame of the vehicle to prevent lateral movement of the spring member and subsequent lateral movement of the air spring and the shock absorber during use of the vehicle even during turning or backing up of the vehicle.

A further object of the present invention is to provide a novel air ride suspension system which uses a limiting assembly to secure a rear end of a spring member to a frame of the vehicle to provide lateral stability through the extent of vertical travel of the spring member, thereby resulting in better stability for and reduced torsion on the spring member, the air spring and the shock absorber.

Yet a further object of the present invention is to provide a novel air ride suspension system which uses a limiting assembly to secure a rear end of a spring member to a frame of the vehicle to retain the spring member at a predetermined distance from the underside of the vehicle, thereby preventing the air spring from being torn apart during use which could happen if the distance the spring member travels exceeds the maximum allowable distance indicated by the air spring manufacturer.

An even further object of the present invention is to provide a novel air ride suspension system which uses a shock-absorber to slow the reaction time of the air spring and to prevent the air spring from jumping back up when the expansion of the air spring is no longer needed.

A specific object of the present invention is to provide a novel air ride suspension system which is especially useful when hauling horses and delicate cargo and a recreational vehicle trailer.

Briefly, and in accordance with the foregoing, the present invention discloses a suspension system for a vehicle. The suspension system includes a pair of modules with each module being provided on an end of the vehicle axle. Each module includes a spring member, preferably a leaf spring, a tower for connecting a front end of the spring member to an underside of the vehicle, an air spring connected between the underside of the vehicle and the spring member, and a limiting assembly, preferably a double-hinged spring shackle assembly, for connecting a rear end of the spring member to the underside of the vehicle. The front end of the spring member is pivotally connected to the tower. The rear end of the spring member is pivotally connected to the limiting assembly. The axle is connected to the spring member. A shock absorber is provided between the underside of the vehicle and the axle. In operation, if no bumps or ruts are encountered, the spring member remains generally horizontal relative to the underside of the vehicle. If one or both of the tires encounter a bump in the road, the rear end of the spring member moves upwardly relative to the underside of the vehicle and the air spring and the shock absorber compress. If one or both of the tires encounter a rut in the road, the rear end of the spring member moves downwardly relative to the underside of the vehicle and the air spring and the shock absorber expand.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
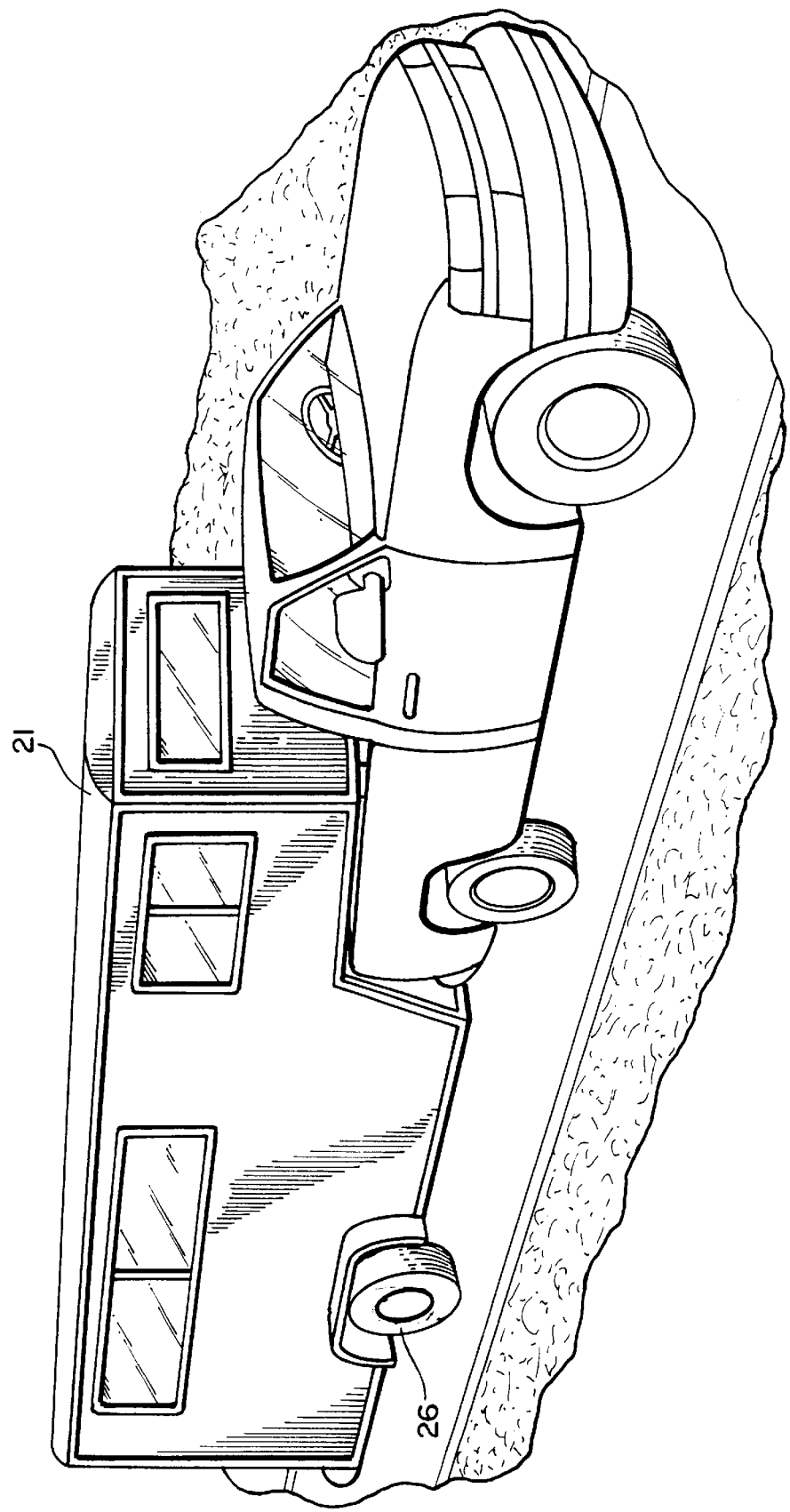
FIG. 1 is a perspective view of a truck and a trailer.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention is an air ride suspension system 20 for a vehicle 21, particularly a trailer, which is primarily designed for axle capacities ranging in size from 3000 lbs. to 8000 lbs. These axles are primarily used in the gooseneck type horse trailer, race car (van) trailer, utility float trailers and all other kinds of recreational vehicle, gooseneck or fifth wheel travel trailer, and special use trailers under 26,000 lb. GVWR. The air ride suspension system 20 of the present invention dissipates normal road vibrations and stress to provide a safe, smooth and longer lasting suspension. This results in an improved ride over prior art suspension systems and improved performance for aluminum and steel gooseneck trailers, fifth wheel travel trailers and recreational vehicle trailers. The life span of the vehicle 21 is also improved with the use of the air ride suspension system 20 of the present invention. The present air ride suspension system 20 is especially useful when hauling horses and delicate cargo and a recreational vehicle trailer.

The air ride suspension system 20 includes a module 22 provided on one end of the vehicle axle 24 and a module 22' provided on the other end of the axle 24. That is, a module 22, 22' is provided in association with each tile 26 on the vehicle 21. The modules 22, 22' are identically formed and, as such, only one module 22 is described with the understanding that the other module 22' is identical in construction and in function.

A front tower 28 is provided and is affixed to the underside of the frame 30 of the vehicle 21 by suitable means, such as welding. The tower 28 extends downwardly from the underside of the frame 30. The tower 28 includes first and second portions 32, 34 which are connected together by an intermediate portion at the top thereof. The portions 32, 34 are spaced apart from each other and each has a top end affixed to the underside of the frame 30 of the vehicle. The tower 28 is made of formed ⅜ flat steel welded into a unit. An I-bolt 38 extends through the first and second portions 32, 34 of the tower 28 at its lower end.

A single spring member 40, preferably a leaf spring, is pivotally attached to the I-bolt 38 between the first and second portions 32, 34 of the tower 28 and can be pivoted relative to the tower 28. The spring member 40 extends rearwardly from the tower 28 towards the rear end of the vehicle 21. The front end of the spring member 40 is wrapped around the I-bolt 38 and suitably attached thereto so that the spring member 40 cannot disengage from the I-bolt 38, but can be pivoted relative to the tower 28. The point 42 at which the spring member 40 is attached to the tower 28 defines a horizontal pivot axis or front pivot point. The spring member 40 is flat and is formed of spring steel. The rear end of the spring member 40 is pivotally connected to a limiting assembly 44, preferably a double-hinged spring shackle assembly, at a rear pivot point 48. An axle centering hole 46 is provided through the spring member 40 at a predetermined distance from the center of the front pivot point 42. As used in the present invention, the spring member 40 has a 24" length from the center of the front pivot point 42 to the center of the rear pivot point 48, has a ½" thickness and is 3", wide, and the axle centering hole 46 is 8" rearward of the front pivot point 48.

A lower spring member 50, preferably a leaf spring, is affixed to the underside of the spring member 40 to provide stiffness to the spring member 40. The lower spring member 50 extends from a point which is a predetermined distance from the front pivot point 42 (1" in the present invention) along the length of the spring member 50 to the a point which is a predetermined distance from the rear pivot point 48 (approximately 4" in the present invention). That is, the lower spring member 50 is not affixed to the tower 28 or to the limiting assembly 44. As a result, spring member 40 provides the moment arm in the system 20.

As shown in the drawings, the limiting assembly 44 is shown as a double-hinged spring shackle assembly which is formed of steel. It is to be understood that other types of limiting assembly may be used so long as the maximum distance the rear end of the spring member 40 can move away from the underside of the vehicle 21 is limited by the assembly.

The double-hinged spring shackle assembly shown in the drawings includes a pair of shackle straps 52a, 52b, each of which has a top end that is affixed to the frame 30, an upper pivot arm 54 and a lower pivot arm 56. The shackle straps 52a, 52b are mounted in-line with the tower 28. The upper pivot arm 54 has a side profile that is straight and has an upper end which is pivotally connected to the lower ends of the shackle straps 52a, 52b by suitable means, such as a bolt 58. The lower end of the upper pivot arm 54 is split into two portions such that a space is provided therebetween. The lower pivot arm 56 has a side profile that is straight has an upper end which seated between the two portions of the upper pivot aim 54 and is pivotally connected thereto by suitable means, such as a bolt 60. The lower end of the lower pivot arm 56 is pivotally connected to the rear end of the spring member 40 by suitable means, such as an I-bolt 62 and at which point the rear pivot point 48 is defined. In the present invention, the upper pivot arm 54 is 5' in length from the center of the hinge point of the upper pivot arm 54 to the shackle straps 52 to the hinge point of the upper pivot arm 54 to the lower pivot arm 56, and the lower pivot arm 56 is 5" in length from the center of the hinge point of the lower pivot arm 56 to the upper pivot arm 54 to the hinge point of the lower pivot arm 56 to the spring member 40.

An air spring assembly 64 is mounted forward of the limiting assembly 44. The air spring assembly 64 includes; upper and lower air spring mounting plates 66, 68 with an air spring 70 affixed to and mounted therebetween. The upper air spring mounting plate 66 is affixed to the underside of the frame 30 and has a length and width which is approximately the same as the length and width of the air spring 70. The upper end of the air spring 70 is affixed to the bottom surface of the upper air spring mounting plate 66 by suitable means. The lower air spring mounting plate 68 is affixed to the top surface of the spring member 40 by suitable means. The rear end of the lower air spring mounting plate 68 is parallel with the rear end of the upper air spring mounting plate 66. The lower air spring mounting plate 68 extends forwardly therefrom a predetermined distance which is spaced from the tower 28. The lower air spring mounting plate 68 has a width which is greater than the width of the spring member 40.

In the present invention, the air spring 70 is preferably a Goodyear air spring. The center of the air spring 70 is 8" rearward of the axle centering hole 46 and 8" forward of the center of the rear pivot point 48. A suitable air source (not shown) is mounted on the frame 30 and is connected to the air spring 70 for supplying air to the air spring 70.

An axle assembly 72 is provided between the tower 28 and the air spring assembly 64. The axle assembly 72 includes the axle 24 which extends between the modules 22, 22' across the width of the vehicle 21, with the opposite ends of the axle 24 being attached to the respective modules 22, 22' by an axle connection structure. Each axle connection structure is identical and, as such, only one is described with the understanding that the construction of the other axle connection structure and the attachment of the other axle connection structure to the other module is identical.

As shown in the drawings, the axle 24 is a dropped center type (4" drop) and may be a round or square axle with an appropriately attached spring seat. The construction of the axle 24 is conventional and the connection of the axle 24 to the wheel mounting apparatus 25 is conventional and, as such, is not described in detail herein. Briefly, a wheel mounting plate 25 is attached to a wheel mounting apparatus 27 and is attached to the axle 24.

The axle 24 is attached to the module 22 by two appropriately sized U-bolts 78, which are appropriate for the size and type of the axle 24. The axle centering hole 46 provided on the spring member 40 aligns the center of the axle 24 8" from the center of the front pivot point 42. A center bolt 47 mounts the axle 24 to the upper air spring mounting plate 68 such that the center bolt 47 extends through the lower air spring mounting plate 68, through the spring member 40, and through a U-bolt axle plate 80. Each U-bolt 78 extends around the sides and the top of the axle 24 and the ends of each U-bolt 78 extend down through the lower air spring mounting plate 68, sits beside respective sides of the spring member 40, and through the U-bolt axle plate 80. Accordingly, the U-bolt axle plate 80 has a width which is greater than the width of the spring member 40. The free ends of the U-bolts 78 may be threaded and are attached to the U-bolt axle plate 80 by suitable means, such as nuts 82. U-bolt torque specifications must be followed in accordance with the manufacturer's recommendations. The lower air spring mounting plate 68 and the U-bolt axle plate 80 are wider than the width of the spring member 40. Consequently, the torque applied to the U-bolts 78 secures the axle assembly 72 to the spring member 40.

A conventional shock-absorber 84 is mounted between the frame 30 and the axle assembly 72. Alternatively, the shock absorber can be mounted between the tower 28 and the axle assembly 72. The upper end of the shock-absorber 84 is mounted to the frame 30 by an upper shock-absorber mounting bracket 86 and is proximate to the front end of the front tower 28. The lower end of the shock-absorber 84 is mounted to the underside of the axle 24 by a lower shock-absorber mounting bracket 88. The upper and lower shock mounting brackets 86, 88 are affixed so as to align the shock-absorber 84 parallel to the spring member 40, with the shock-absorber 84 orientation forward of the axle 24.

The use of the limiting assembly 44 in the present invention provides several advantages not provided in the prior art. The limiting assembly 44 secures the rear end of the spring member 40 to the frame 30 and prevents lateral movement of the spring member 40 and subsequent lateral movement of the air spring 70 and the shock absorber 84 during use of the vehicle 21 even during turning or backing up of the vehicle 21. In addition, the limiting assembly 44 provides lateral stability through the extent of vertical travel of the spring member 40. This results in better stability for and reduced torsion on the spring member 40, on the air spring 70 and on the shock absorber 84. The limiting assembly 44 also retains the spring member 40 at a predetermined distance from the upper air spring mounting plate 66. This distance is not greater than the maximum allowable distance of expansion indicated by the air spring manufacturer. This prevents the air spring 70 from being torn apart during use which could happen if the distance the spring member 40 travels exceeds the maximum allowable distance indicated by the air spring manufacturer. The shock-absorber 84 in the present invention is used to slow the reaction time of the air spring 70 and to prevent the air spring 70 from jumping back up when the expansion of the air spring 70 is no longer needed.

Figure 2:
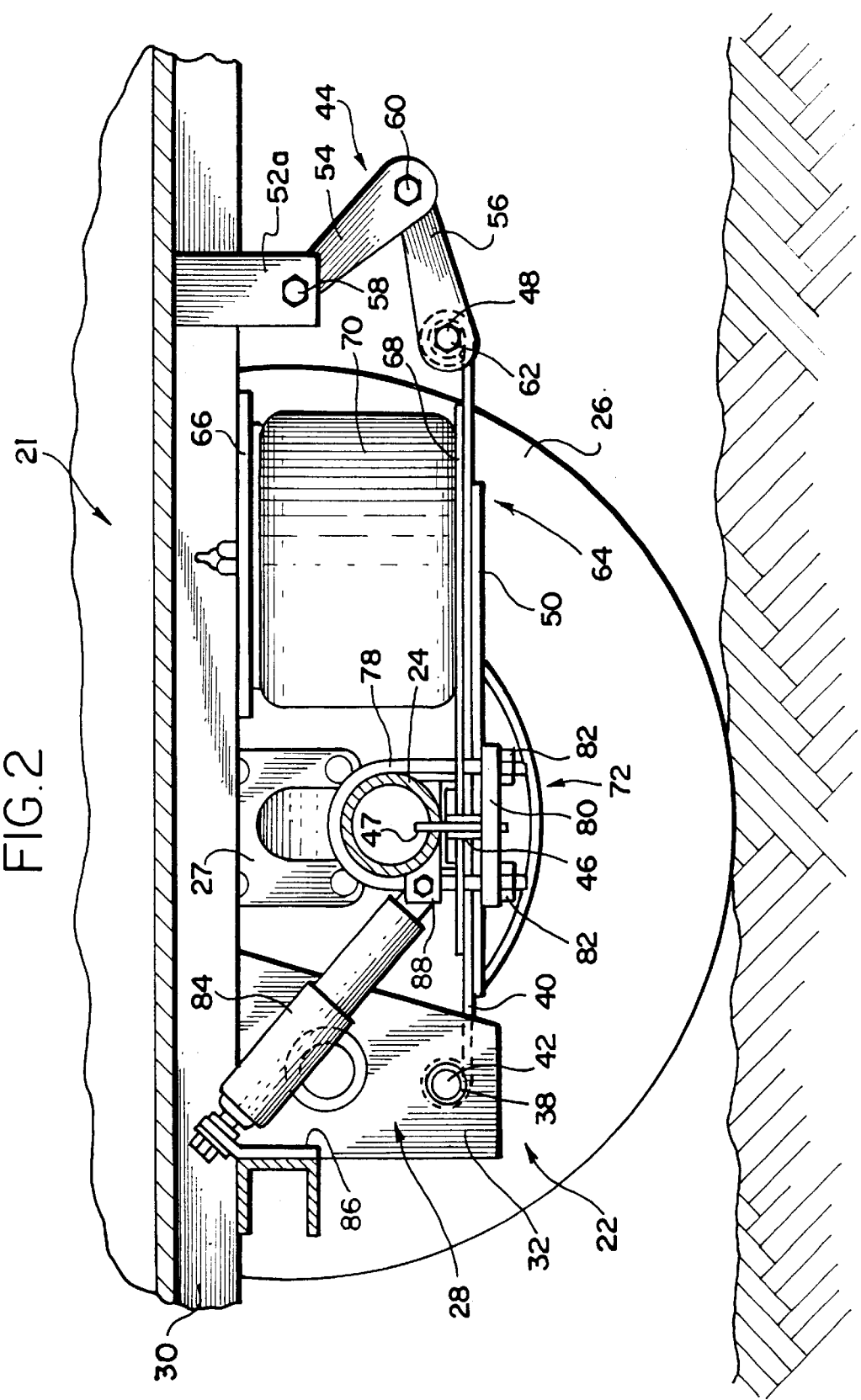
FIG. 2 is a side elevational view of a portion of a suspension system for the trailer of FIG. 1, which suspension system incorporates the features of the invention and is shown in a first position.

In operation, as the vehicle 21 travels over the roads, if no bumps or ruts are encountered, the spring member 40 remains generally horizontal relative to the underside of the vehicle 21, as seen in FIG. 2.

As the vehicle 21 travels over the roads, one or both of the tires 26 may encounter a bump in the road. When the bump is encountered, the tire or tires 26 moves upwardly which causes the axle 24 to move upwardly relative to the underside of the vehicle 21. The function of the air ride suspension system 20 of the present invention is described with respect to one module 22. If both tires 26 encounter the bump then the other module 22 will function in the same manner. The rear end of the spring member 40 moves upwardly and the front end of the spring member 40 pivots around the front pivot point 42 thus moving the spring member 40 from its generally horizontal position. The air spring 70 compresses. The shock-absorber 84 compresses. The lower pivot arm 56 of the limiting assembly 44 moves towards the upper pivot arm 54 such that the lower pivot arm 56 pivots relative to the spring member 40 at the rear pivot point 48 and pivots relative to the upper pivot arm 54 at the center hinge point formed by the bolt 60. The upper pivot and 54 may pivot relative to the spring shackle straps 52a, 52b at the point of the bolt 58.

Once the tire or tires 26 roll over the bump, the air spring 70 and shock-absorber 84 expand as the axle 24 moves downwardly. The lower pivot arm 56 of the limiting assembly 44 moves away from the upper pivot arm 54 such that the lower pivot arm 56 pivots relative to the spring member 40 at the rear pivot point 48 and pivots relative to the upper pivot arm 54 at the center hinge point formed by the bolt 60.

Figure 3:
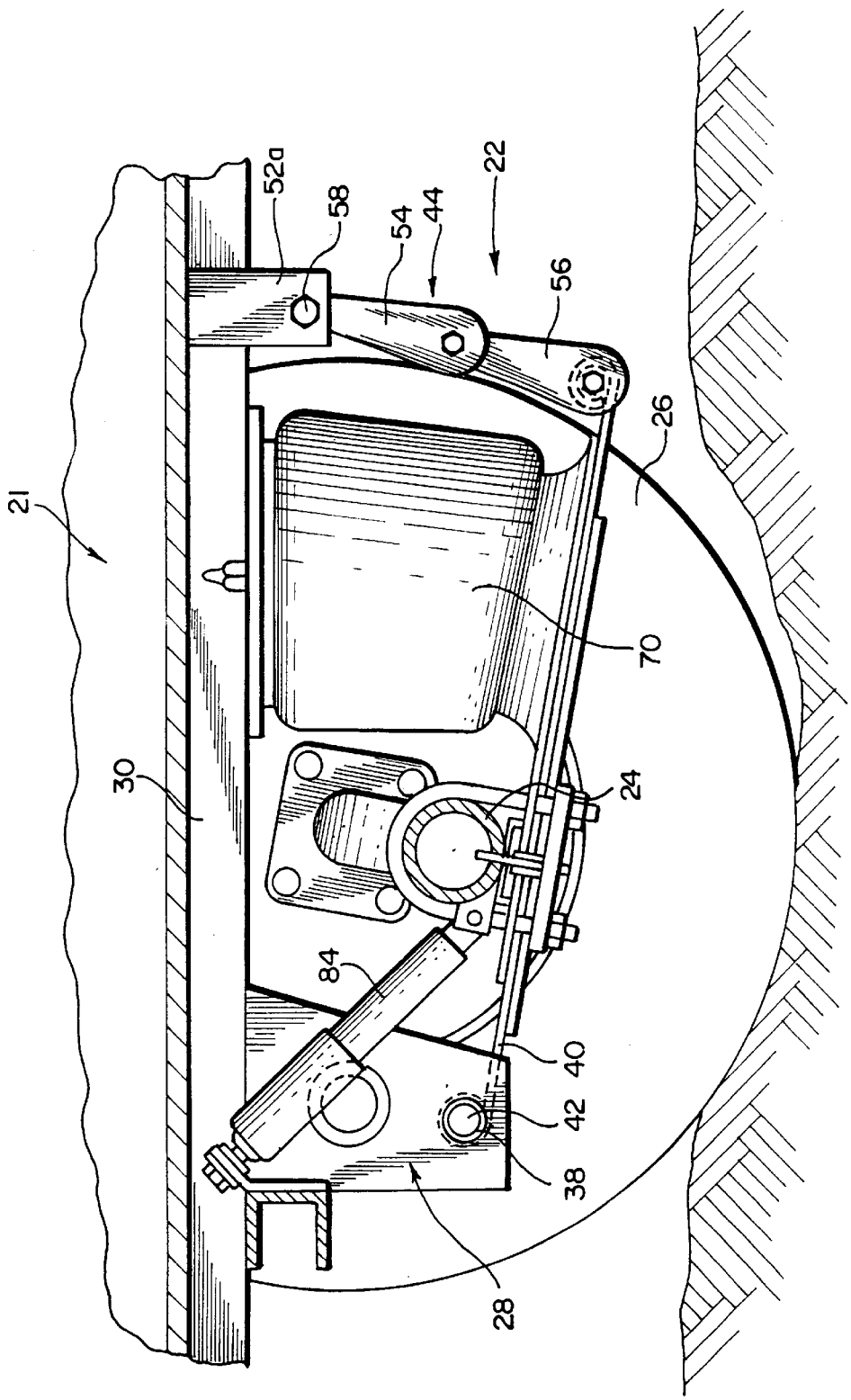
FIG. 3 is a side elevational view of a portion of the suspension system, which suspension system is shown in a second position.
Figure 4:
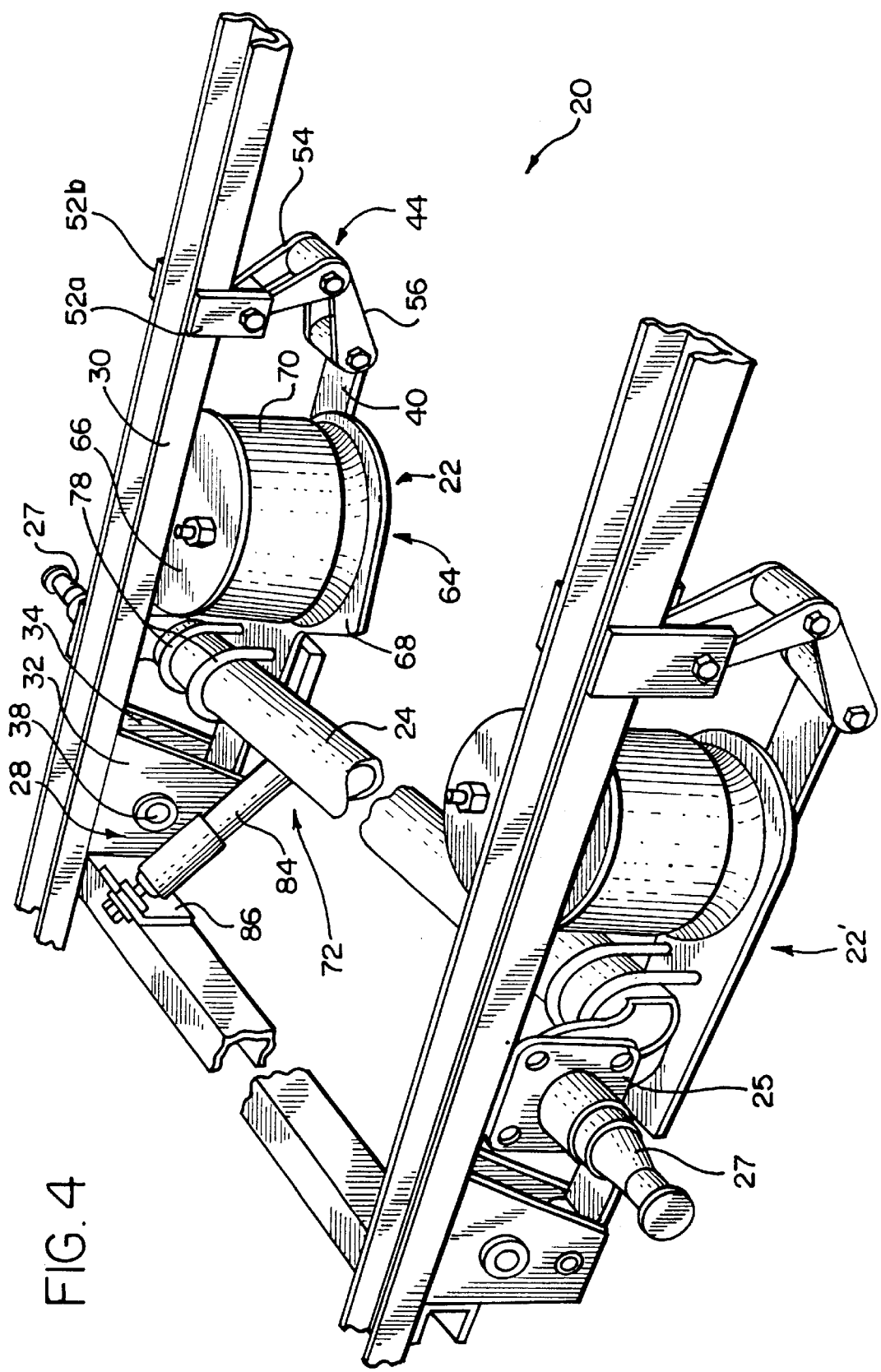
FIG. 4 is a perspective view of the suspension system of the present invention.

Also in operation, as the vehicle 21 travels over the roads, one or both of the tires 26 may encounter a rut or depression in the road, as seen in FIG. 3. When the rut is encountered, the tire or tires 26 moves downwardly which causes the axle 24 to move downwardly relative to the underside of the vehicle 21. The function of the air ride suspension system 20 of the present invention is described with respect to one module 22. If both tires 26 encounter the rut then the other module 22 will function in the same manner. The rear end of the spring member 40 moves downwardly and the front end of the spring member 40 pivots around the front pivot point 42 relative to the tower 28. The air spring 70 expands. The shock-absorber 84 expands. The lower pivot arm 56 of the limiting assembly 44 moves away from the upper pivot arm 54 such that the lower pivot arm 56 pivots relative to the spring member 40 at the rear pivot point 48 and pivots relative to the upper pivot arm 54 at the point of bolt 60. The upper pivot arm 54 may pivot relative to the spring shackle straps 52a, 52b at the pivot point provided by bolt 58.

The amount of downward travel of the module 22 is limited by the limiting assembly 44. As shown in FIG. 3, the module 22 is at its downward travel limit.

Once the tire or tires 26 come out of the rut, the air spring 70 and shock-absorber 84 compress as the axle 24 moves upwardly. The shock-absorber 84 slows the reaction time of the air spring 70 to prevent the air spring 70 from jumping back up. The lower pivot arm 56 of the limiting assembly 44 moves towards the upper pivot arm 54 such that the lower pivot arm 56 pivots relative to the spring member 40 at the rear pivot point 48 and pivots relative to the upper pivot arm 54 at the center hinge point formed by the bolt 60.

As can be seen, the air ride suspension system 20 of the present invention constantly adjusts to changing road conditions to create a smooth ride.

The present invention can be modified to be used for axle capacities ranging in size up to 25,000 lbs. by increasing the spring member 40 width and thickness and by increasing the thicknesses of the other components of the air ride suspension system 20.

While a preferred embodiment of the present invention is shown and described, it is envisioned that those skilled in the art may devise various modifications of the present invention without departing from the spirit and scope of the appended claims.

The invention claimed is:

1. A light duty trailer comprising:
   a frame;
   an axle having a capacity of 8000 pounds or less; and
   a suspension system for mounting said axle beneath said frame, said suspension system including
      a single spring member having a front end and a rear end, said axle being connected to said spring member,
      a tower fixedly connected to and extending downwardly from said frame, said front end of said spring member being pivotally connected to a lower portion of said tower,
      an inflated air spring connected between said frame and said spring member, and
      a limiting assembly connected to said rear end of said spring member and to said frame, said limiting assembly limiting the distance of vertical travel of said air spring while allowing vertical movement of said spring member relative to said frame when the light duty trailer is traveling over roads, said limiting assembly further substantially preventing lateral movement of said spring member.

2. A light duty trailer as defined in clam 1, wherein said spring member is a leaf spring.

3. A light duty trailer as defined in claim 1, wherein said spring member is formed of spring steel.

4. A light duty trailer as defined in claim 1, wherein said limiting assembly includes an upper pivot arm connected to said frame and a lower pivot arm connected to said upper pivot arm and to said rear end of said spring member, said upper pivot arm being capable of pivoting relative to said frame, said upper and lower pivot arms being capable of pivoting relative to each other, and said lower pivot arm being capable of pivoting relative to said spring member.

5. A light duty trailer as defined in claim 1, further including a shock absorber mounted between said frame and said axle.

6. A light duty trailer as defined in claim 1, wherein said tower spaces said front end of said spring member from said frame such that said spring member can be generally horizontal relative to said frame or said spring member can be angled relative to said frame.

7. A light duty trailer as defined in claim 1, wherein said axle is forward to said air spring.

8. A suspension system for an axle of a light duty trailer, said light duty trailer having an axle capacity of 8000 pounds or less, said suspension system comprising:
   a single spring member having a front end and a rear end;
   a tower fixedly connected to and extending downwardly from an underside of the light duty trailer, said front end of said spring member being pivotally connected to a lower portion of said tower;
   an axle connected to said spring member;
   an inflated air spring connected between the underside of the light duty trailer and said spring member; and
   a limiting assembly connected to said rear end of said spring member and to the underside of the light duty trailer, said limiting assembly limiting the distance of vertical travel of said air spring while allowing vertical movement of said spring member relative to the underside of the light duty trailer when the light duty trailer is traveling over roads, said limiting assembly further substantially preventing lateral movement of said spring member
   wherein said spring member is flat.

9. A light trailer comprising:
   a frame;
   an axle having a capacity of 8000 pounds or less; and
   a pair of modules, each said module being provided on an end of said axle, each said module comprising a single spring member having a front end and a rear end, said axle being connected to said spring member, a tower fixedly connected to and extending downwardly from said frame, said front end of said spring member being pivotally connected to a lower portion of said tower, an inflated air spring connected between said frame and said spring member, and a limiting assembly pivotally connected to said rear end of said spring member and to said frame, said limiting assembly limiting the distance of vertical travel of said air spring while allowing vertical movement of said spring member relative to said frame when the light duty trailer is traveling over roads, said limiting assembly further substantially preventing lateral movement of said spring member.

10. A light duty trailer as defined in claim 9, wherein in each said module, said spring member is a leaf spring.

11. A light duty trailer as defined in claim 9, wherein in each said module, said spring member is formed of spring steel.

12. A light duty trailer as defined in claim 9, wherein in each said module, said limiting assembly includes an upper pivot arm connected to said frame and a lower pivot arm connected to said upper pivot arm and to said rear end of said spring member, said upper pivot are being capable of pivoting relative to said frame, said upper and lower pivot arms being capable of pivoting relative to each other, and said lower pivot arm being capable of pivoting relative to said spring member.

13. A light duty trailer as defined in claim 9, wherein each said module further includes a shock absorber mounted between said frame and said axle.

14. A light duty trailer as defined in claim 9, wherein in each said module, said connecting means spaces said front end of said spring member from said frame such that said spring member can be generally horizontal relative to said frame or said spring member can be angled relative to said frame.

15. A light trailer as defined in claim 9, wherein each said module, said axle is forward of said air spring.

16. A suspension system for an axle of a light duty trailer, said light duty trailer having an axle capacity of 8000 pounds or less, said suspension system comprising:

an axle;

a pair of modules each said module being provided on an end of said axle, each said module comprising a single spring member having a front end and a rear end, said axle being connected to said spring member, a tower fixedly connected to and extending downwardly from an underside of the light duty vehicle, said front end of said spring member being pivotally connected to a lower portion of said tower, an inflated air spring connected between the underside of the light duty trailer and said spring member, and a limiting assembly pivotally connected to said rear end of said spring member and to the underside of the light duty trailer, said limiting assembly limiting the distance of vertical travel of said air spring while allowing vertical movement of said spring member relative to the underside of the light duty trailer when the light duty trailer is traveling over roads, said limiting assembly further substantially preventing lateral movement of said spring member, wherein in each said module, said spring member is flat.

* * * * *